United States Patent
Babich (10) Patent No.: US 8,131,983 B2
(45) Date of Patent: Mar. 6, 2012

(54) METHOD, APPARATUS AND ARTICLE OF MANUFACTURE FOR TIMEOUT WAITS ON LOCKS

(75) Inventor: Alan F. Babich, Mission Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 12/111,157

(22) Filed: Apr. 28, 2008

(65) Prior Publication Data

US 2009/0271789 A1    Oct. 29, 2009

(51) Int. Cl.
*G06F 9/46* (2006.01)
*G06F 9/48* (2006.01)

(52) U.S. Cl. ...................... 712/228; 718/108
(58) Field of Classification Search ............... 712/228; 718/108
See application file for complete search history.

(56) References Cited

U.S. PATENT DOCUMENTS

| 5,802,357 A * | 9/1998 | Li et al. ........................... 1/1 |
| 6,728,959 B1 * | 4/2004 | Merkey ..................... 718/102 |
| 7,421,681 B2 * | 9/2008 | DeWitt et al. ............... 717/128 |
| 2002/0120663 A1 | 8/2002 | Binns |
| 2003/0126416 A1 | 7/2003 | Marr et al. |
| 2005/0080963 A1 * | 4/2005 | Schopp ...................... 710/200 |
| 2005/0268273 A1 | 12/2005 | Fresko et al. |
| 2007/0136311 A1 | 6/2007 | Kasten et al. |
| 2008/0148002 A1 * | 6/2008 | Fleming ..................... 711/170 |

* cited by examiner

*Primary Examiner* — Daniel Pan
(74) *Attorney, Agent, or Firm* — Patterson & Sheridan, LLP (57) ABSTRACT

Embodiments of the invention provide techniques for performing timeout waits of process threads. Generally, a thread requesting access to locked resource sends a timeout request to a timeout handler process, and then goes to sleep. The timeout request is received by a receiving thread of the timeout handler process. The receiving thread may insert the timeout request into a minimum heap of timeout requests, and may determine whether the inserted request is due earlier than any of the existing timeout requests. If so, the receiving thread may interrupt a timing thread of the timeout handler process. The timing thread may then wait until reaching the requested timeout, and then send a wakeup message to the sleeping thread.

16 Claims, 7 Drawing Sheets

METHOD, APPARATUS AND ARTICLE OF MANUFACTURE FOR TIMEOUT WAITS ON LOCKS

BACKGROUND OF THE INVENTION

1. Field of the Invention

Embodiments of the invention relate to managing access to shared resources on a computer system. More specifically, embodiments of the invention relate to techniques for managing process threads using a method for timeout waits on user-implemented locks.

2. Description of the Related Art

Computers typically include a main memory for storing programs and a processor for executing the programs stored in the main memory. The processor may schedule and execute multiple threads, and each thread is used to perform a computing task. For example, a plurality of threads may be used to execute an application such as a video game which performs three-dimensional graphics rendering, sound effects, physics simulations, player input/output, and other functions.

In a multithreaded computing environment, each thread may access data resources stored in shared memory. Such data resources may be "locked," meaning that they are reserved for exclusive use by a single thread for a given task or duration. Once the lock is released, another thread may access the resource. The use of a lock reduces the likelihood of the resource becoming corrupted by unintended interactions between multiple threads accessing the resource concurrently.

SUMMARY OF THE INVENTION

One embodiment of the invention includes a computer-implemented method for protecting a user of a virtual world. The method generally includes: sending, by a first thread, a timeout request message to a timeout handler process; transitioning the first thread to an indefinitely blocked state; determining, from the timeout request message, a timeout period after which the first thread should be unblocked from the indefinitely blocked state while waiting to access to the shared resource; storing the timeout request message in a data structure configured to store a plurality of timeout request messages; and upon determining that the timeout period has elapsed and that the first thread is still requesting access to the shared resource, sending a wakeup message to a message queue associated with the indefinitely blocked thread.

Another embodiment of the invention includes a computer-readable storage medium containing a program, which when executed on a processor performs an operation, comprising: sending, by a first thread, a timeout request message to a timeout handler process; transitioning the first thread to an indefinitely blocked state; determining, from the timeout request message, a timeout period after which the first thread should be unblocked from the indefinitely blocked state while waiting to access to the shared resource; storing the timeout request message in a data structure configured to store a plurality of timeout request messages; and upon determining that the timeout period has elapsed and that the first thread is still requesting access to the shared resource, sending a wakeup message to a message queue associated with the indefinitely blocked thread.

Still another embodiment of the invention includes a system having a processor and a memory. The memory may store a program, which when executed by the processor, is configured to perform the steps of: sending, by a first thread, a timeout request message to a timeout handler process; transitioning the first thread to an indefinitely blocked state; determining, from the timeout request message, a timeout period after which the first thread should be unblocked from the indefinitely blocked state while waiting to access to the shared resource; storing the timeout request message in a data structure configured to store a plurality of timeout request messages; and upon determining that the timeout period has elapsed and that the first thread is still requesting access to the shared resource, sending a wakeup message to a message queue associated with the indefinitely blocked thread.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In a multithreaded computing environment, each thread may access data resources stored in shared memory. Prior to accessing a shared resource (e.g., shared memory) a thread may "lock" access to that resource. Once the lock is released, another thread may access the resource. The use of a lock may prevent resource corruption caused by unintended interactions between multiple threads accessing the resource concurrently. In some situations, a thread will request access to a resource that is already locked by another thread. In such situations, the requesting thread may be put to "sleep," meaning it is put in an indefinitely blocked state to wait for the resource to be available. Once the resource becomes available, the requesting resource may be "awakened" (i.e., unblocked). In some cases, the period that a thread may sleep is limited to a defined period. That is, if the requested resource does not become available within a given period of time, the sleeping thread may be awakened. This approach prevents threads from sleeping for extended periods of time. Thus, the use of time-limited sleep periods, referred to herein as "timeout waits," may allow for more efficient use of the computer system. In some operating systems (e.g., UNIX® based systems such as IBM®'s AIX and distributions of the Linux® operating system), a process may perform a timeout wait by putting itself to sleep, and then scheduling a wakeup signal to be received after the timeout period. However, this approach cannot be used to perform a thread-level timeout wait. This is because such signals (e.g., UNIX® signals) are delivered to an operating system process, not to a particular thread within a process. That is, the wakeup signal provided by operating systems such as UNIX®, Linux®, and Windows® provides a process level communications mechanism. Thus, when the wakeup signal is transmitted to a given process, there is no guarantee that it will be received by the desired thread. Rather, it may be received by any thread in the process.

Embodiments of the invention provide techniques for performing timeout waits for locks at the thread level. In one embodiment, a background process (referred to as the timeout handler process) is created with two threads. When a thread (T) wants to perform a timeout wait on a lock, the thread (T) sends a wakeup-request message to a message queue provided by the timeout handler process. The wakeup-request message includes data relevant to the particular timeout wait. Then, thread (T) blocks indefinitely on its message queue waiting for a message indicating either that the resource has become available or that the timeout period has expired. The timeout handler process ensures that the blocked thread (T) will not block longer than the specified timeout period. If the timeout period elapses but the lock has not been released, the timeout handler process will send a message to the message queue of the blocked thread T to unblock it.

In other words, when requesting access to a locked resource, a first thread sends a timeout request message to the timeout handler process and then goes to sleep. In one embodiment, a thread of the timeout handler process receives the request and inserts it into a minimum heap storing multiple timeout requests. Further, the timeout handler process may determine whether the newly inserted request will time out earlier than any other timeout request in the minimum heap. If so, the receiving thread of the timeout handler process may interrupt a timing thread of the timeout handler process. The timing thread may then sleep until the earlier timeout request, and then send a wakeup message to the sleeping first thread (assuming that the first thread is still waiting for the lock).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
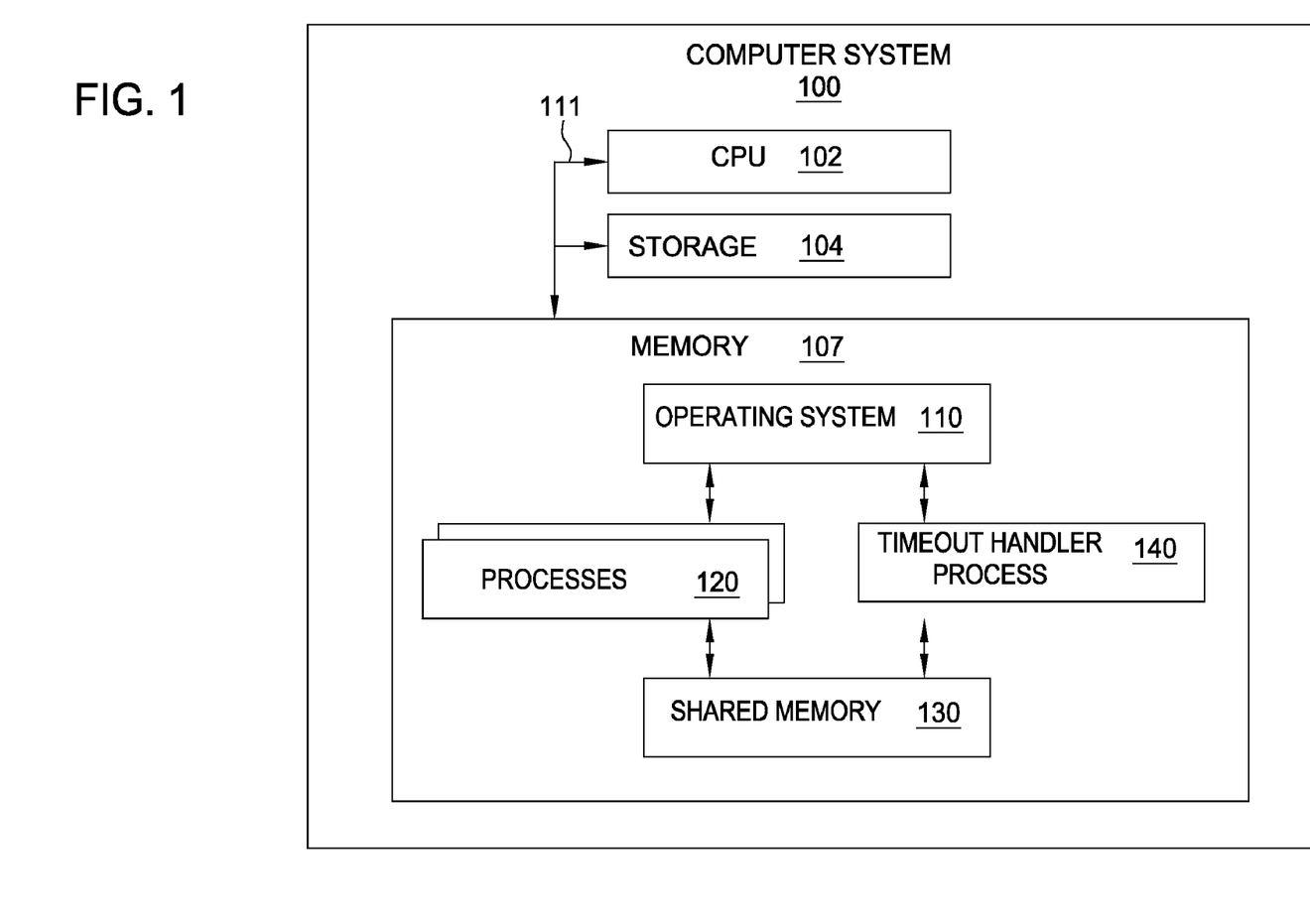
FIG. 1 is a block diagram illustrating a computer system, according to one embodiment of the invention.

FIG. 1 is a block diagram illustrating a computer system 100, according to one embodiment of the invention. In one embodiment, computer system 100 may represent an existing computer system, e.g., desktop computer, server computer, laptop computer, tablet computer, and the like. However, computer system 100 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, computer system 100 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 100. Storage 104 may be hard-disk drives, flash memory devices, optical media and the like. Optionally, computer system 100 may be operably connected to a data communications network (not shown).

Memory 107 can be one or a combination of memory devices, including random access memory, nonvolatile or backup memory, (e.g., programmable or flash memories, read-only memories, etc.). As shown, memory 107 includes an operating system (OS) 110, processes 120, shared memory 130 and timeout handler process 140. OS 110 is the software used for managing the operation of the computer system 100. Examples of OS 110 may include a UNIX® distribution, a version of the Microsoft Windows® operating system, and distributions of the Linux® operating system. (Note, Linux is a trademark of Linus Torvalds in the United States and other countries.) Processes 120 represent memory spaces that are each reserved for exclusive use by a process. Each process 120 may include multiple threads (not shown). Each thread may be serial thread of control (e.g., a POSIX thread). Shared memory 130 represents a physical memory address space that may be accessed by multiple processes, thus allowing the processes to share data resources stored in the shared memory 130.

The timeout handler process 140 may represent a normal user mode process. However, timeout handler process 140 could also represent an operating system process. In one embodiment, the timeout handler process 140 may include a receiving thread, a timing thread, and a data structure used to store timeout requests (not shown). Preferably, the data structure is a minimum heap with the timeout requests that will timeout the soonest at the root of the heap. The receiving thread may be configured to receive lock timeout requests from threads running in other processes and the timing thread may be configured to wake up sleeping threads when a timeout wait request expires. The timeout handler process 140 is discussed in further detail below.

Figure 2:
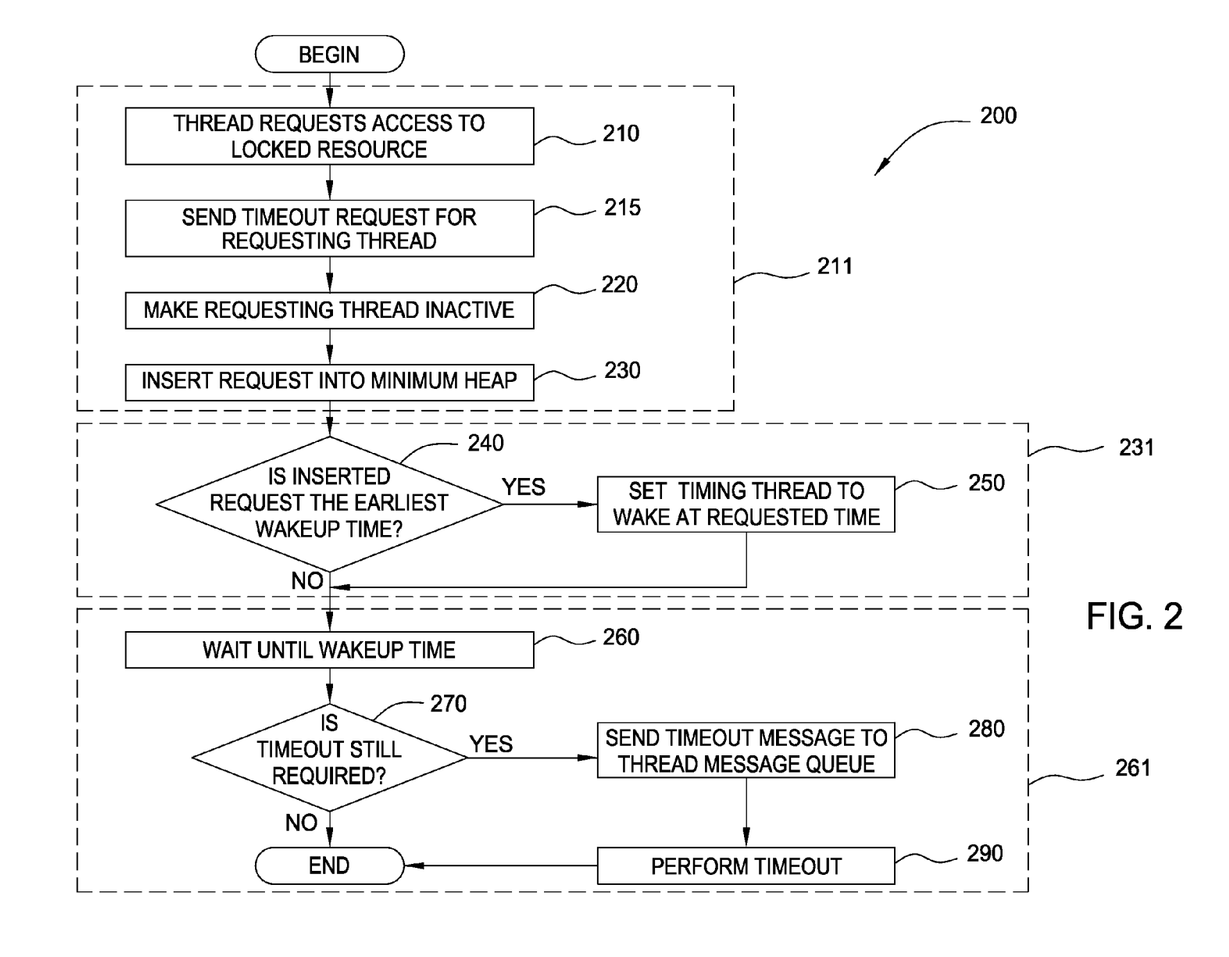
FIG. 2 illustrates a method for performing a timeout wait for a process thread requesting access to a resource locked by a process lock, according to one embodiment of the invention.
Figure 3A:
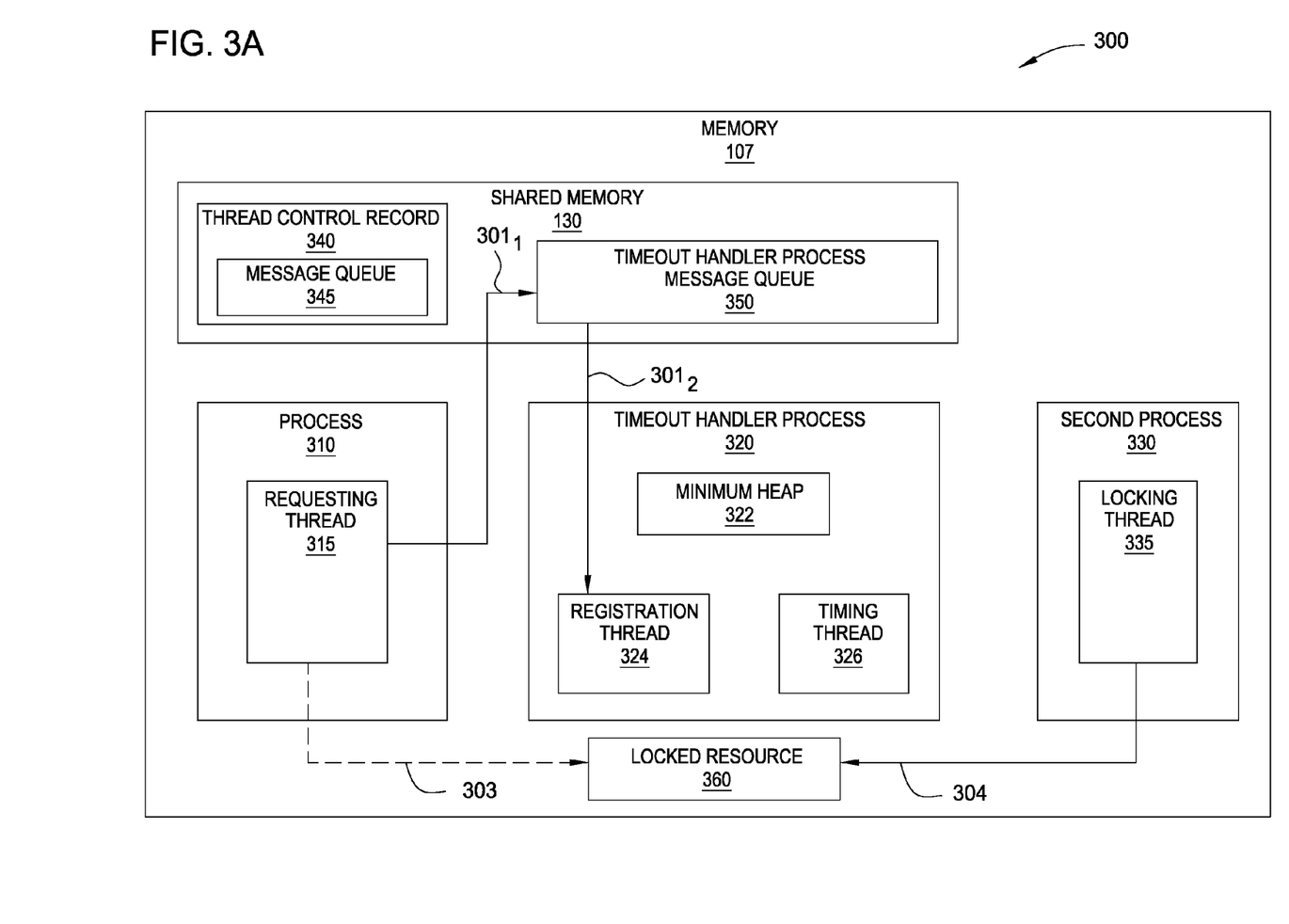
FIGS. 3A-3C illustrate block diagrams of software components performing a timeout wait for a process thread, according to one embodiment of the invention.
Figure 3B:
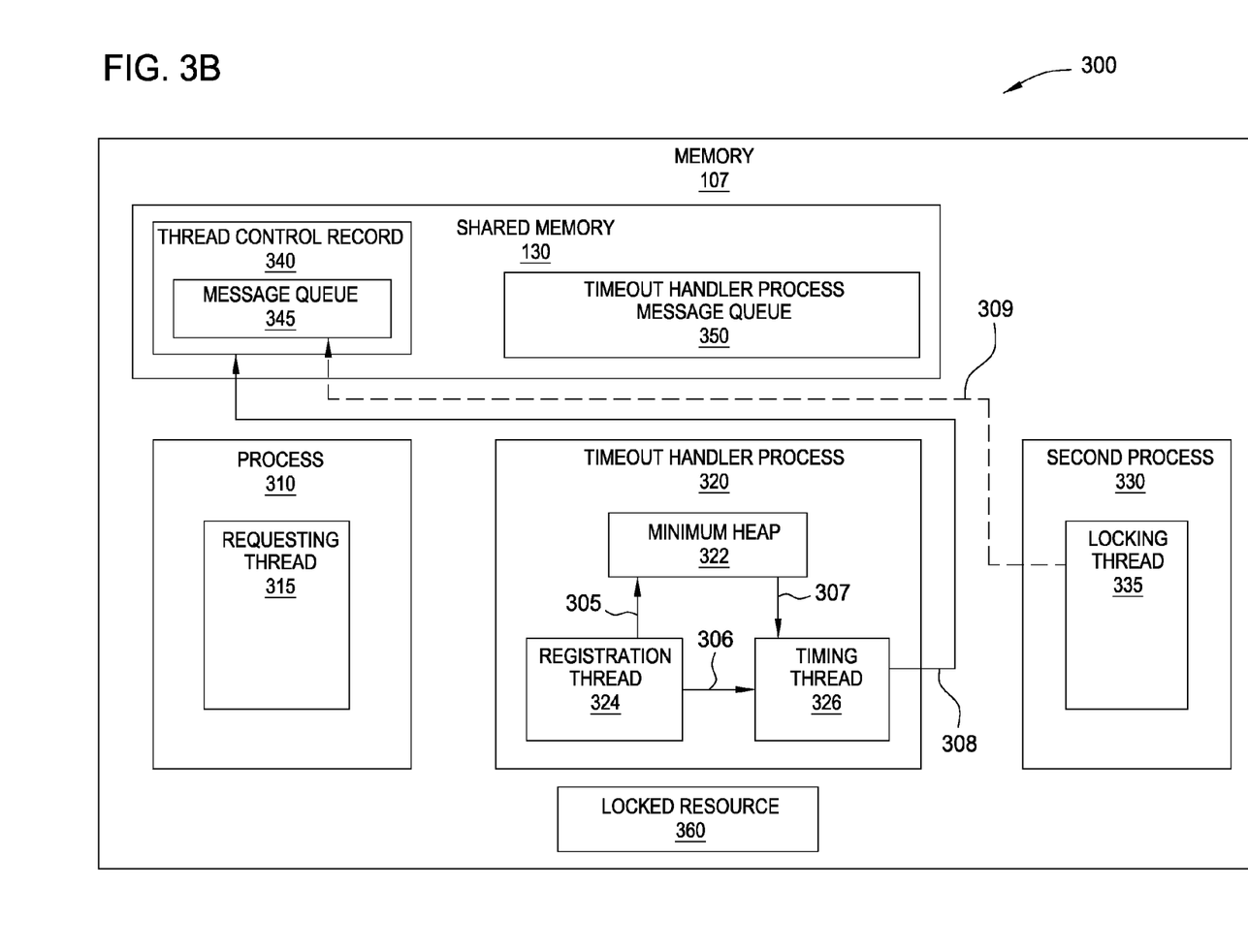
Figure 3C:
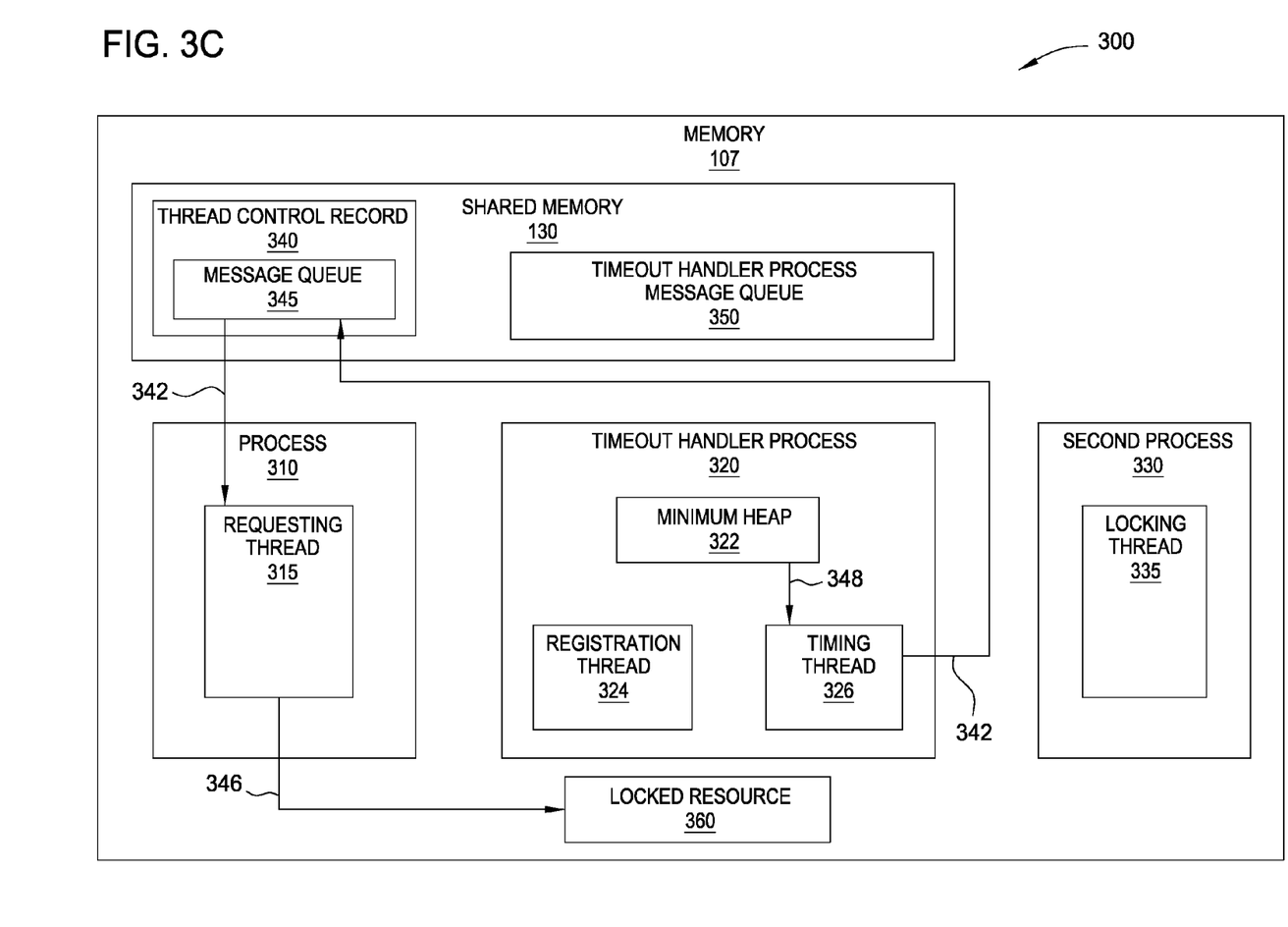

FIG. 2 is a flow diagram illustrating a method 200 for performing a timeout wait for a process thread requesting access to a resource locked by a process lock, according to one embodiment of the invention. Note that method 200 may be performed multiple times, namely each time a process thread requires a timeout wait for a lock. The method 200 is described below with reference to FIGS. 3A-3C, and FIG. 4. FIGS. 3A-3C are block diagrams 300 illustrating the state of software components at various stages while performing the method 200, according to one embodiment of the invention. However, persons skilled in the art will understand that any system configured to perform the steps of the method 200, in any order, is within the scope of the present invention.

As shown, the method 200 begins at step 210, where a first thread requests a locked resource (e.g., shared memory). That is, the first thread requests access to a resource that is already locked by another thread. For example, as shown in FIG. 3A, memory 107 includes a process 310, which itself includes a requesting first thread 315. As shown by an arrow 303, requesting first thread 315 attempts to lock resource 360. However, in this example, resource 360 is locked for use by a locking thread 335. Ownership of this lock is illustrated by an arrow 304 connecting locking thread 335 and locked resource 360. In this situation, requesting thread 315 may be put in a timeout wait, meaning that this thread may be put in a sleep state for a period of time to wait for locked resource 360 to become available.

Referring again to FIG. 2, at step 215, a timeout request for the requesting thread is generated. Then, at step 220, the requesting first thread is blocked. In one embodiment, the timeout request specifies a wakeup time, meaning a time at which the sleeping thread should be awakened (assuming locked resource does not become available in the interim). Alternatively, the timeout request may specify a timeout period, meaning a sleeping period after which the sleeping thread should be awakened. For example, FIG. 3A shows requesting thread 315 sending a timeout request message (represented as an arrow $301_1$) to a message queue 350 managed by a timeout handler process 320. In response, the message queue 350 sends the timeout request message (represented by an arrow $301_2$) to a registration thread 324 included in a timeout handler process 320. In one embodiment, registration thread 324 is configured to receive timeout requests from threads that are waiting on locked resources (e.g., the locked resource 360).

Referring again to FIG. 2, at step 230, the timeout request is inserted into a minimum heap 322. In one embodiment, the minimum heap is a data structure storing multiple wakeup times (each for a different thread requesting access to a locked resource), with the earliest wakeup time at the top of the heap. For example, as shown in FIG. 3B, the registration thread 324 inserts a timeout request (represented as an arrow 305) into a minimum heap 322. As part of this, the minimum heap 322 may re-balance the values in the minimum heap 322 to maintain heap consistency.

Figure 4:
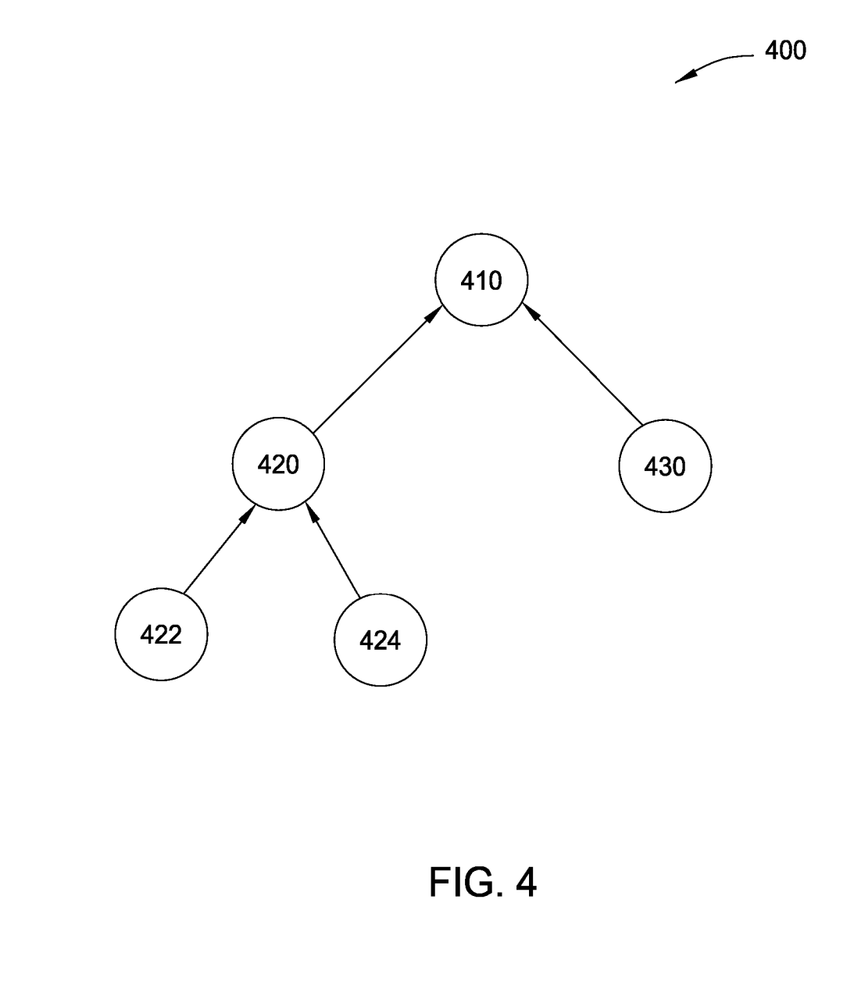
FIG. 4 is a conceptual diagram of a minimum heap, according to one embodiment of the invention.

FIG. 4 illustrates an example of a minimum heap 400, according to one embodiment of the invention. As shown, minimum heap 400 provides a tree structure which includes a root node 410, representing the earliest wakeup time in the minimum heap 400. Root node 410 has two child nodes 420 and 430, representing wakeup times that are later than (or equal to) the wakeup time of root node 410. Similarly, child node 420 has two child nodes 422 and 424, representing wakeup times that are later than (or equal to) the wakeup time of child node 420. Thus, in the minimum heap 400, each child node is known to not have a wakeup time earlier than the node above it. Furthermore, the height of the tree is always minimal.

Referring again to FIG. 2, at step 240, registration thread 324 may determine whether the timeout request is the earliest wakeup time in the minimum heap. If so, at step 250, a timing thread 326 is set to wake at the time specified in the timeout request generated at step 220. However, if it is determined that the timeout request is not the earliest wakeup time in the minimum heap, the method 200 continues at step 260, leaving the time that the timing thread 326 will wake up unchanged. Thus, the timing thread 326 always wakes-up at the time of the earliest wakeup request in the minimum heap 322; namely, the time listed in the root node of the minimum heap 322). At step 260, the timing thread 326 waits until reaching the earliest wakeup time in the minimum heap, i.e., the wakeup time reflected in the root node. At step 270, once the wakeup time is reached, the timing thread 326 determines whether the requested timeout message is still required. If the thread requesting the timeout message has terminated, or if the requesting thread has received access to the locked resource, no timeout message is necessary. In such a case, the timing thread 326 may be configured to pull the root node from the minimum heap 322, re-balance the minimum heap 322, and then sleep with a wake up time reflecting the time in the root node of the minimum heap 322. If the heap is empty, the timing thread may sleep with an arbitrary wakeup time.

FIG. 3B illustrates an example of steps 240, 250, 260 and 270 being performed by the timeout handler process 320. As shown, registration thread 324 determines whether timeout request 305, when inserted into minimum heap 322, is the earliest wakeup time in minimum heap 322 (represented by an arrow 305). If so, registration thread 324 may send an interrupt message (represented by an arrow 306) to a timing thread 326 included in timeout handler process 320. In response, timing thread 326 will sleep for a timeout period (i.e., a sleep period) until reaching the next wakeup time. That is, the timing thread 326 will go to sleep until a wakeup time determined as the earliest wakeup time in minimum heap 322, again, the time listed in the root node of the minimum heap 322.

In one embodiment, timing thread 326 simply runs an infinite loop configured to sleep for a defined time, wake up, and then return to a sleeping state until the next wake up time. Upon waking, timing thread 326 inspects the earliest wakeup time of the minimum heap 322 (i.e., the root node). If minimum heap 322 is empty (i.e., there are no pending wakeup times), then timing thread 326 is configured to go to sleep for some predefined period. If there is any time remaining until the earliest wakeup time, then timing thread 326 resets itself to sleep until reaching the earliest wakeup time. If there is not any time remaining until the earliest wakeup time, then timing thread 326 is configured to determine whether the requested timeout is still required by performing a validation of thread control record 340 (represented by an arrow 308). Specifically, the timing thread 326 determines whether the thread control required 340 indicates that thread 315 is still waiting for access to a locked resource. If so, the timing thread 326 sends a timeout message to the requesting thread 315, removes the root node from the minimum heap 322 (represented by an arrow 307), re-balances the minimum heap 322, and then sleeps with a wake up time reflecting the new wake time in the root node of the minimum heap 322.

Figure 5:
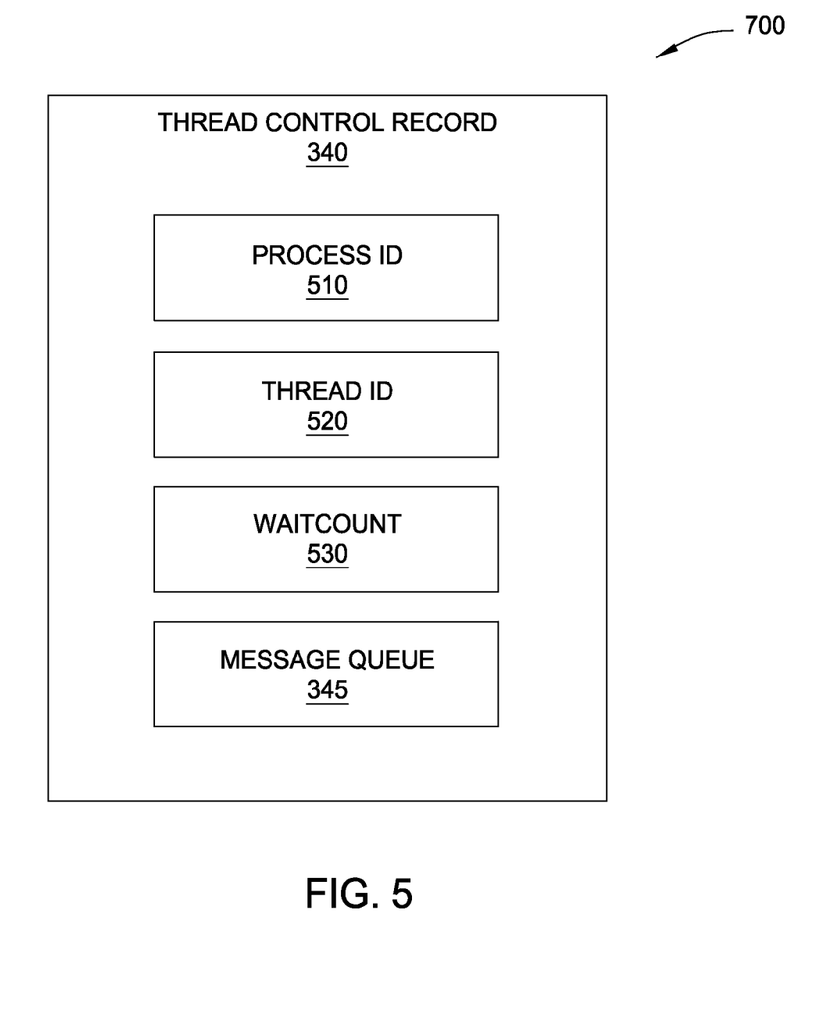
FIG. 5 is a block diagram illustrating a thread control record, according to one embodiment of the invention.

FIG. 5 is a block diagram 500 illustrating an exemplary thread control record 340, according to one embodiment of the invention. In one embodiment, thread control record 340 includes multiple data elements corresponding to the requesting thread 315. As shown, thread control record 340 includes a process id 510, a thread id 520, a waitcount 530 and message queue 345. Process id 510 identifies which process created requesting thread 315 (i.e., process 310). Thread id 520 identifies the associated thread 315. Waitcount 530 is an integer field indicating the number of times that the requesting thread 315 has had to wait for a locked resource. Message queue 345 is configured to receive incoming messages sent to the associated thread of thread control record 340.

Referring again to FIG. 3B, the validation represented by the arrow 308 may be performed by comparing data included in the current timeout to data included in thread control record 340. If the result of this validation indicates that the current timeout does not match the process id 510 or the thread id 520 of thread control record 340, the requesting thread 315 may be assumed to have terminated, and thus the thread control record 340 may have been assigned to a different thread. Alternatively, if the results of this validation indicate that the current timeout does not match the waitcount 530 of thread control record 340, the requesting thread 315 may be assumed to be waiting on a different timeout. For example, assume locking thread 335 releases locked resource 360. In this event, locking thread 335 may send a lock release message 309 to notify message queue 345 that locked resource 360 is now available. Requesting thread 315 may then continue to initiate another timeout wait for a different resource. Thus, when the timeout corresponding to the first timeout wait completes, validation 308 may indicate that the requesting thread no longer requires waking up. Since the current timeout is no longer required, timing thread 326 performs no further action.

Referring again to FIG. 2, if it is determined at step 270 that the timeout is not required, the method 200 terminates. However, if it is determined at step 270 that the timeout is still required, then at step 280, a timeout message is sent to the message queue of the thread control record. At step 290, the timeout is performed by sending a wakeup message to the inactive thread. After step 290, method 200 terminates.

FIG. 3C illustrates an example of steps 280 and 290 being performed by the timeout handler process 320. After determining that the timeout is still required, timing thread 326 sends a wakeup message to message queue 345 (represented using an arrow 342). In this specific example, the wakeup message is sent to requesting thread 315. In response, requesting thread 315 is awakened, and may now access the locked resource 360 (represented by the arrow 346). Once a timeout has been completed (or if the timeout is no longer required), timing thread 326 may be further configured to perform a cleanup of the minimum heap 322, as described above. More specifically, timing thread 326 may remove the completed timeout request from the minimum heap 322, and may reorder minimum heap 322 accordingly.

Referring again to FIG. 2, method 200 is illustrated with a box 211 (shown in a dotted line) surrounding step 210, step 215 and step 220. In one embodiment, box 211 represents the steps that may be performed by requesting first thread 315. Further, method 200 is illustrated with a box 231 surrounding step 230, step 240 and step 250. In one embodiment, box 231 represents the steps that may be performed by registration thread 324. Furthermore, method 200 is illustrated with a box 261 surrounding step 260, step 270, step 280 and step 290. In one embodiment, box 261 represents the steps that may be performed by timing thread 326. Note that box 211, box 231 and box 261 may represent steps occurring concurrently (e.g., steps executed concurrently by different threads), within constraints known to one of skill in the art.

Of course, the above examples are provided for illustrative purposes only, and are not intended to be limiting of the invention. For example, it is contemplated that the steps of method 200 may be performed in a different order or combination, depending on the application. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing a timeout wait for a thread requesting access to a shared resource locked by a process lock, comprising:

sending, by a first thread, a timeout request message to a timeout handler process;

transitioning the first thread to an indefinitely blocked state;

determining, from the timeout request message, a timeout period after which the first thread should be unblocked from the indefinitely blocked state while waiting to access to the shared resource;

storing the timeout request message in a minimum heap data structure configured to store a plurality of timeout request messages, wherein nodes of the minimum heap data structure store one of the plurality of timeout request messages, and wherein the minimum heap data structure is sorted based on a timeout period corresponding to each respective timeout request message; and upon determining that the timeout period has elapsed and that the first thread is still requesting access to the shared resource, sending a wakeup message to a message queue associated with the indefinitely blocked thread.

2. The computer-implemented method of claim 1, further comprising, prior to storing the timeout request message in the data structure:

upon determining that the timeout period ends prior to any time period in the plurality of timeout request messages stored in the data structure:
  interrupting a timing thread performing a sleep period corresponding to the earliest time period; and
  setting a new sleep period for the timing thread to correspond to the timeout period specified in the a timeout request message sent by the first thread.

3. The computer-implemented method of claim 2, wherein the timeout handler process includes a message receiving thread, the timing thread and the data structure.

4. The computer-implemented method of claim 1, wherein the timeout period corresponding to each respective timeout request message is determined from at least one of: (i) a wakeup time specified in the timeout request message, and (ii) a timeout period specified in the timeout request message.

5. The computer-implemented method of claim 1, further comprising, in response to receiving the wakeup message, unblocking the first thread.

6. The computer-implemented method of claim 1, wherein determining that the first thread is still requesting access to the shared resource comprises evaluating one or more data elements of a thread control record corresponding to the first thread.

7. The computer-implemented method of claim 6, wherein the one or more data elements comprise at least one of: (i) a process identifier, (ii) a thread identifier, and (iii) a variable indicating the number of times that the sleeping thread has waited in a timeout wait.

8. A computer-readable storage medium containing a program, which when executed on a processor performs an operation, comprising:
  sending, by a first thread, a timeout request message to a timeout handler process;
  transitioning the first thread to an indefinitely blocked state;
  determining, from the timeout request message, a timeout period after which the first thread should be unblocked from the indefinitely blocked state while waiting to access to the shared resource;
  storing the timeout request message in a minimum heap data structure configured to store a plurality of timeout request messages, wherein nodes of the minimum heap data structure store one of the plurality of timeout request messages, and wherein the minimum heap data structure is sorted based on a timeout period corresponding to each respective timeout request message; and
  upon determining that the timeout period has elapsed and that the first thread is still requesting access to the shared resource, sending a wakeup message to a message queue associated with the indefinitely blocked thread.

9. The storage medium of claim 8, further comprising, prior to storing the timeout request message in the data structure:
  upon determining that the timeout period ends prior to any time period in the plurality of timeout request messages stored in the data structure:
    interrupting a timing thread performing a sleep period corresponding to the earliest time period; and
    setting a new sleep period for the timing thread to correspond to the timeout period specified in the a timeout request message sent by the first thread.

10. The storage medium of claim 9, wherein the timeout handler process includes a message receiving thread, the timing thread and the data structure.

11. The storage medium of claim 8, wherein the timeout period corresponding to each respective timeout request message is determined from at least one of: (i) a wakeup time specified in the timeout request message, and (ii) a timeout period specified in the timeout request message.

12. The storage medium of claim 8, further comprising, in response to receiving the wakeup message, unblocking the first thread.

13. The storage medium of claim 8, wherein determining that the first thread is still requesting access to the shared resource comprises evaluating one or more data elements of a thread control record corresponding to the first thread.

14. The storage medium of claim 13, wherein the one or more data elements comprise at least one of: (i) a process identifier, (ii) a thread identifier, and (iii) a variable indicating the number of times that the sleeping thread has waited in a timeout wait.

15. A system, comprising:
  a processor; and
  a memory containing a program, which when executed by the processor is configured to perform the steps of:
    sending, by a first thread, a timeout request message to a timeout handler process;
    transitioning the first thread to an indefinitely blocked state;
    determining, from the timeout request message, a timeout period after which the first thread should be unblocked from the indefinitely blocked state while waiting to access to the shared resource;
    storing the timeout request message in a minimum heap data structure configured to store a plurality of timeout request messages, wherein nodes of the minimum heap data structure store one of the plurality of timeout request messages, and wherein the minimum heap data structure is sorted based on a timeout period corresponding to each respective timeout request message; and
    upon determining that the timeout period has elapsed and that the first thread is still requesting access to the shared resource, sending a wakeup message to a message queue associated with the indefinitely blocked thread.

16. The system of claim 15, further comprising, prior to storing the timeout request message in the data structure:
  upon determining that the timeout period ends prior to any time period in the plurality of timeout request messages stored in the data structure:
    interrupting a timing thread performing a sleep period corresponding to the earliest time period; and
    setting a new sleep period for the timing thread to correspond to the timeout period specified in the a timeout request message sent by the first thread.

* * * * *